United States Patent Office 3,507,830
Patented Apr. 21, 1970

3,507,830
LINEAR POLYESTER AMIDES PREPARED FROM 4,6 DIOXA - 1-AZA-BICYCLO [3,3,0] OCTANES AND DICARBOXYLIC ACID ANHYDRIDES
Roland Feinauer, Haltern, Germany, assignor to Chemische Werke Huls A.G., Marl, Germany
No Drawing. Filed Jan. 17, 1968, Ser. No. 698,433
Claims priority, application Germany, Jan. 31, 1967, C 41,378
Int. Cl. C08g 20/30
U.S. Cl. 260—47                    10 Claims

ABSTRACT OF THE DISCLOSURE

Linear polyamidoesters, useful as plasticizers or for coatings, of the formula

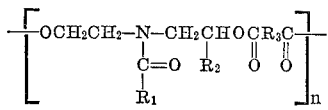

wherein $R_1$ is an organic residue, $R_2$ is an organic residue or hydrogen, and $R_3$ is a 2 or 3 carbon atom chain, made by reacting an anhydride of a dicarboxylic acid, such as phthalic, maleic or succinic anhydride, with a 4,6-dioxa-1-azabicyclo[3,3,0]octane compound.

---

This invention relates to linear polyester amides and to the preparation thereof.

An object of this invention, therefore, is to provide linear polyester amides.

Another object of this invention is to provide a process for the manufacture of such compounds, as well as to provide the necessary starting and intermediate compounds therefor.

Upon further study of the specification and claims, other objects and advantages of the present invention will become apparent.

To attain the objects of this invention, there are provided linear polyester amides of the formula:

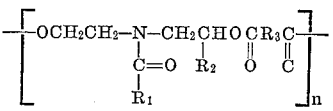

wherein:
$R_1$ represents aliphatic, preferably alkyl of 1–4 carbon atoms; cycloaliphatic, preferably cycloalkyl of 6 carbon atoms; or aryl radicals, preferably aryl of 6 carbon atoms which can also be optionally substituted by alkyl radicals with 1–4 carbon atoms.
$R_2$ represents all the possibilities of $R_1$, as well as hydrogen, alkoxymethylene wherein the alkoxy group is of 1 to 12 carbon atoms, allyloxymethylene, or phenoxymethylene.
$R_3$ represents a carbon chain of two or three carbon atoms, saturated or monethylenically unsaturated, e.g., ethylene, vinylene, trimethylene, propylene, or part of a cyclohexane ring, or part of an aromatic ring, preferably a hydrocarbon aromatic ring of 6 carbon atoms, wherein the cyclohexane ring or the aromatic ring can also be optimally substituted by alkyl radicals with 1–4 carbon atoms.
$n$ is the degree of polymerization of the adduct, and is generally about 5 to 500, preferably about 10 to 100.

These polyester amides can also be named polyamidoesters since the carbonyl portion of the amide is in the side chain, and only the nitrogen atom is present in the linear chain of the polymer.

These linear polyester amides can be advantageously manufactured by reacting, at temperatures of about 20–200° C., preferably about 100 to 180° C., 4,6-dioxa-1-aza-bicyclo[3,3,0]octanes of the general formula:

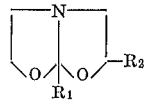

wherein $R_1$ and $R_2$ have the previously indicated meanings, with dicarboxylic acid anhydrides of the general formula:

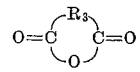

wherein $R_3$ has the previously indicated meanings.

The 4,6-dioxa-1-azabicyclo[3,3,0]octanes required as starting materials can be manufactured in a simple manner from epoxides and $\Delta^2$-oxazolines, by heating the starting materials to 120–200° C. in accordance with the disclosure of German patent application C 38,818 corresponding to "Liebigs Annalen der Chemie," 698 (1966) pp. 174–179. The reaction equation is as follows:

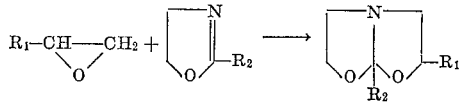

Examples of 4,6-dioxa-1-azabicyclo[3,3,0]octanes suitable for the process include, but are not limited to 4,6-dioxa-1-azabicyclo[3,3,0]octane, 5-methyl-, 5-ethyl-, 5-propyl-, 5-butyl, 5-phenyl-, 5-undecyl-, 3-methyl-, 3-ethyl-, 3-propyl-, 3-butyl-, 3-phenyl-, 3-methoxyphenyl-, 3-phenoxymethyl-, 3-lauryloxymethyl-, 3-allyoxymethyl-, 3, 5-dimethyl-, 3-methyl-5-ethyl-, 3-methyl-5-propyl-, 3-methyl-5-undecyl-, 3-methyl-5-phenyl-, 3-ethyl-5-methyl-, 3,5-diethyl-, 3-ethyl-5-propyl-, 3-ethyl-5-phenyl-, 3-propyl-5-ethyl-, 3-butyl-5-phenyl-, 3-phenyl-5-methyl-, 3-phenyl-5-ethyl-, 3-phenyl-5-propyl-, 3-phenyl-5-undecyl-, 3,5-diphenyl-, 3-phenoxymethyl-5-methyl-, 3-phenoxymethyl-5-ethyl-, 3-lauryloxymethyl-5-methyl-, 3-lauryloxymethyl-5-ethyl-, 3-allyloxymethyl-5-methyl-, 3-allyloxymethyl-5-ethyl-, 3-allyloxymethyl-5-phenyl-, 3-methyl-5-tolyl-, and 3-methoxyphenyl-5-phenyl-4,6-dioxa-1-azabicyclo[3,3,0]octane, 3-methyl-5-cyclohexyl-, 3-cyclohexyl-5-methyl-, 3-tolyl-5-methyl-, 3-methyl-5-tolyl-, and 3 - methoxyphenyl - 5 - phenyl - 4,6 - dioxa - 1 - azabicyclo(3.3.0)octane.

Examples of suitable dicarboxylic acid anhydrides include, but are not limited to succinic acid anhydride, methylsuccinic acid anhydride, dimethylsuccinic acid anhydride, glutaric acid anhydride, phthalic acid anhydride, cyclohexanedicarboxylic acid(1,2) - anhydride, maleic acid anhydride, methylmaleic acid anhydride, and dimethylmaleic acid anhydride, ethylsuccinic acid anhydride, ethylphthalic acid anhydride.

To conduct the reaction, a mixture of 4,6-dioxa-1-azabicyclo[3,3,0]octane and the dicarboxylic acid anhydride in preferably equimolar proportions is normally brought to the reaction temperature, under stirring, advantageously in the presence of a stream of an inert gas, such as pure nitrogen previously dried over silica gel and concentrated sulfuric acid. If desired, the reaction can be conducted in the presence of an inert solvent, such as, for example, benzene or chloroform, and when such inert solvent is used, it is preferred for the reaction temperature to be about 40–80° C. However, it is also possible to provide one reactant and then add the other one after the reaction temperature has been attained.

Surprisingly, a polyaddition reaction takes place during the process, leading to high molecular weight products. The reaction products can either be used directly, or they can be dissolved in a suitable solvent and precipitated in a suitable precipitant in order to purify the product and separate low molecular weight components.

When conducting the reaction in an inert solvent, the reaction products can be isolated by removing the solvent by evaporation or by precipitation in a suitable precipitant.

The process of this invention, which makes it possible to produce linear polyester amides by a polyaddition reaction, generally takes place relatively rapidly, e.g., from 0.1 to 8, preferably 0.5 to 2 hours.

The degree of polymerization $n$ of the polyester amides produced according to this invention is dependent to a large extent on the purity of the starting materials, since traces of water and acids have a chain-breaking effect. Higher molecular weight products are obtained when dicarboxylic acid anhydrides are employed which were purified by recrystallization, distillation or sublimation— the contamination by dicarboxylic acids being eliminated thereby—and by the utilization of 4,6 - dioxa-1-azabicyclo[3,3,0]octanes which were freshly distilled because of their strongly hygroscopic properties. By freshly distilled is meant to employ the substance for reaction immediately after distillation, generally within 1 to 2 minutes.

The influence exerted by the purity of the starting materials on the degree of polymerization or the molecular weight of the polyester amides can be seen from the following examples. According to the process described in Example 5, by reacting 5 - ethyl - 3 - phenyl-4,6 - dioxa - 1 - azabicyclo[3,3,0]octane with succinic acid anhydride recrystallized from benzene, a polyester amide is obtained which has an average molecular weight of 5,880 after reprecipitation from chloroform/ether. However, a polyester amide produced in the same manner but with commercially available succinic acid anhydride dried in a desiccator, has an average molecular weight of 3,800 after reprecipitation from chloroform/ether. If, in addition to recrystallized succinic acid anhydride, there is likewise employed a purified, freshly distilled 5 - ethyl - 3 - phenyl - 4,6 - dioxa - 1 - azabicyclo[3,3,0]octane, then products are obtained which, after reprecipitation from chloroform/ether, surprisingly exhibit a much higher average molecular weight of 14,000 (see Example 6).

The linear polyester amides produced according to the process of the present invention can be utilized as plasticizers for synthetic materials, as coatings, for the production of shaped articles and films. Further, by using unsaturated starting materials, such as unsaturated polyester resins, cross-linkable plastics can be produced.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

In a stirrer-equipped flask, 21.93 g. (0.1 mol) of 5 - ethyl - 3 - phenyl - 4,6 - dioxa - 1 - azabicyclo[3,3,0] octane and 14.81 g. (0.1 mol) of phthalic acid anhydride (purified with thionyl chloride and twice recrystallized from benzene) are heated under a stream of dry nitrogen for 3 hours to 140° C. and then for 1 hour to 160° C. A slightly yellow, brittle polyester amide is obtained having a softening point of 90–100° C. and an acid number of 6.9.

The determination of the molecular weight by vapor pressure osmosis yields a number for the average molecular weight $\overline{M}_n$ of 1,470. The crude product (20 g. thereof) is dissolved in a small amount of chloroform, and the solution is poured into five times the amount of ether. After the precipitate has been decanted, it is dried for 2 days in a vacuum drying chamber at 40° C. The yield is 16.65 g. (83.2% of theory) of a slightly yellow powder having a softening point of 87–92° C., which no longer contains free acid. The determination of the molecular weight of the purified product by vapor pressure osmosis, is $\overline{M}_n=3,850$. The empirical formula is confirmed as follows:

Calculated for $C_{21}H_{21}NO_5$ (367.4), percent: C, 68.85; H, 5.76; N, 3.81; O, 21.78. Found (percent): C, 68.50; H, 5.83; N, 3.78; O, 22.22.

This polymer is thus structurally represented as the following:

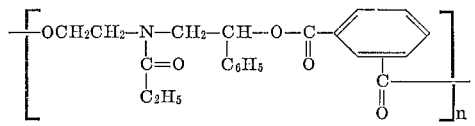

Example 2

As described in Example 1, 13.35 g. (0.05 mol) of 3,5-diphenyl-4,6-dioxa-1-azabicyclo[3,3,0]octane and 7.40 g. (0.05) mol) of phthalic acid anhydride, purified as set forth in Example 1, are heated for 1 hour to 140° C. and then for 1 hour to 160° C. A brown, brittle resin results having a softening point of 113–120° C. (acid number 13.3) and an average molecular weight $\overline{M}_n$ of 1,500 (vapor pressure osmosis).

Ten grams of the crude product are reprecipitated, as described in Example 1, from chloroform/ether. The thus-precipitated powdery, yellowish reaction product (7.1 g.= 71% of theory) no longer contains free acid and has, according to vapor pressure osmosis determination, an average molecular weight $\overline{M}_n$ of 4,250. The empirical formula is confirmed as follows:

Calculated for $C_{25}H_{21}NO_5$ (415.4), (percent): C, 72.28; H, 5.10; N, 3.37; O, 19.26. Found (percent): C, 71.78; H, 5.18; N, 3.30; O, 19.36.

Example 3

As described in Example 1, 24.9. (0.1 mol) of 5-ethyl-3-phenoxymethyl - 4,6 - dioxa-1-azabicyclo[3,3,0]octane and 14.81 g. (0.1 mol) of phthalic acid anhydride, purified as in Example 1, are heated for hour to 140° C. and then 1 hour to 160° C. A yellowish polyester amide results having no acid number and a softening point of 75–85° C. The average molecular weight number $\overline{M}_n$ is determined to be 3,850 (vapor pressure osmosis).

Of this crude product, 20 g. are precipitated, as described in Example 1, from chloroform/ether. A powder results which is only slightly yellow (18.9 g.=94.5% of theory), having a softening point of 75–83° C. and a number average molecular weight $M_n$ of 5,880 (vapor pressure osmosis).

The emperical formula is confirmed as follows:

Calculated for $C_{22}H_{223}NO_6(_397.4)$, (percent): C, 66.49; H, 5.83; N, 3.52; O, 24.16. Found (percent): C, 66.45; H, 5.93; N, 3.41; O, 24.26.

Example 4

As set forth in Example 1, 14.92 g. (0.075 mol) of 5-methyl - 3 - allyloxymethyl - 4,6 - dioxa-1-azabicyclo-[3,3,0]octane and 11.10 g. (0.075 mol) of phthalic acid anhydride, purified as described in Example 1, are heated for 1 hour to 140° C. and then 1 hour to 160° C. The resulting brown reaction product has an acid number of 5.6 and a softening range of 60–64° C. The number average molecular weight of the crude product $\overline{M}_n$ is determined to be 2,780 (vapor pressure osmosis).

For purification, 14 g. of the crude product are reprecipitated from chloroform/ether as described in Example 1. A brown acid-free powder results having a softening point of 65–71° C., an average molecular weight $\overline{M}_n$ of 3,850 (vapor pressure osmosis), and a yield of 8.85 g. (61.1% of theory). The empirical formula is confirmed as follows:

Calculated for $C_{18}H_{21}NO_6$ (347.4), (percent): C, 62.24; H, 6.10; N, 4.03; O, 27.64. Found (percent): C, 61.56; H, 6.06; N, 3.87; O, 27.72.

Example 5

As described in Example 1, 21.93 g. (0.1 mol) of 5-ethyl-3-phenyl-4,6-dioxa-1-azabicyclo[3,3,0]octane and 10.00 g. (0.1 mol) of succinic acid anhydride, recrystallized from benzene, are heated for 2 hours to 140° C. A yellow polyester amide results which is practically acid-free, exhibits a softening point of 71-74° C. and, according to vapor pressure osmosis, has an average molecular weight of $\overline{M}_n = 4,600$.

For purposes of purification, 15 g. of the crude product are reprecipitated, as described in Example 1, from chloroform/ether. There results 14.5 g. (96.6% of theory) of a yellowish powder having a softening point of 68–75° C. and an average molecular weight (vapor pressure osmosis) $\overline{M}_n$ of 5,880. The empirical formula is confirmed as follows:

Calculated for $C_{17}H_{21}NO_5$ (319.3), (percent): C, 63.93; H, 6.63; N, 4.39; O, 25.05. Found (percent): C, 63.66; H, 6.65; N, 4.23; O, 25.34.

Example 6

There are heated for 30 minutes to 120° C. 21.93 g. (0.1 mol) of 5-ethyl-3-phenyl-4,6-dioxa-1-azabicyclo[3,3,0]-octane, freshly distilled directly before use, and 10.00 g. (0.1 mol) of succinic acid anhydride recrystallized from benzene, dry nitrogen being passed over the reaction mixture. The thus-resulting polyester amide is reprecipitated from chloroform/ether. A vapor pressure osmosis determination of the molecular weight shows a number average value $\overline{M}_n$ of 14,000. The empirical formula is confirmed as follows:

Calculated for $C_{17}H_{21}NO_5$ (319.3), (percent): C, 63.93; H, 6.63; N, 4.39; O, 25.05. Found (percent): C, 63.46; H, 6.53; N, 4.31; O, 25.72.

Example 7

As described in Example 1, 18.43 g. (0.075 mol) of 5-ethyl-3-phenoxymethyl-4,6-dioxa-1-azabicyclo[3,3,0]octane and 7.50 g. (0.075 mol) of succinic acid anhydride, recrystallized from benzene, are heated for 2 hours to 120° C. A brown reaction product results having no free acid, a softening point of 54-58° C., and an average molecular weight $\overline{M}_n$ of 5,400 (vapor pressure osmosis).

For purification purposes, 15 g. of the crude product are reprecipitated as described in Example 1 from chloroform/ether, resulting in 13.5 g. (90.3% of theory) of a brownish powder having a softening point of 61–66° C. By vapor pressure osmosis, an average molecular weight $\overline{M}_n$ of 10,500 is determined. The empirical formula is confirmed as follows:

Calculated for $C_{18}H_{23}NO_6$ (349.4), (percent): C, 61.88; H, 6.64; N, 4.01; O, 27.48. Found (percent): C, 61.65; H, 6.53; N, 3.85; O, 27.20.

Example 8

7.36 g. (0.075 mol) of distilled maleic acid anhydride are dissolved in 50 ml. of chloroform. With dry nitrogen being passed over the reaction solution, and with vigorous stirring, a solution of 16.45 g. (0.075 mol) of 5-ethyl-3-phenyl-4,6-dioxa-1-azabicyclo[3,3,0]octane is added all at once. A solution having a deep reddish brown color results. Owing to the exothermic heat of reaction, the internal temperature is increased to 45° C. The solution is then stirred for 1 hour at room temperature, and the reaction product is precipitated from the solution with five times the quantity of ether. The precipitated powdery product, having a slightly pink color, after having been dried in a vacuum drying chamber, weighs 18.8 g. (75.5% of theory). The softening point of the product is around 115–123° C., and the acid number is 83.5. The empirical formula is confirmed as follows:

Calculated for $C_{17}H_{19}NO_5$ (317.3), percent: C, 64.34; H, 6.04; N, 4.41; O, 25.21. Found (percent): C, 62.28; H, 6.02; N, 3.80; O, 27.50.

Example 9

10.00 g. (0.1 mol) of succinic acid anhydride, recrystallized from benzene, are dissolved, under heating, in 100 ml. of benzene p.a. (p.a. stands for pro analysis. That is a marking for a grade of purity.) When all the anhydride has been dissolved, 21.93 g. (0.1 mol) of freshly distilled 5-ethyl-3-phenyl-4,6-dioxa-1-aza-bicyclo[3,3,0]octane are added all at once, and the reaction mixture is then heated under reflux for 4 hours. Thereafter, the solvent is removed under vacuum, and the residue is reprecipitated from chloroform/ether. An almost colorless powder results, having an average molecular weight $\overline{M}_n$ of 10,500, as determined by vapor pressure osmosis. The empirical formula is confirmed as follows:

Calculated for $C_{17}H_{21}NO_5$ (319.3), percent: C, 63.93; H, 6.63; N, 4.39; O, 25.05. Found (percent): C, 63.12; H, 6.55; N, 4.39; O, 25.89.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A linear film-forming polyester amide of the formula

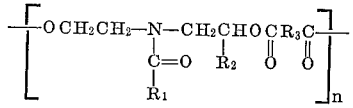

wherein
$R_1$ represents alkyl of 1–4 carbon atoms, cycloalkyl of 6 carbon atoms or hydrocarbon aryl of 6 carbon atoms;
$R_2$ represents $R_1$, hydrogen, alkoxymethylene wherein the alkoxy is of 1–12 carbon atoms, allyloxymethylene or phenoxymethylene;
$R_3$ represents at 2–3 carbon member chain and is ethylene, vinylene, trimethylene, propenylene or part of a hydrocarbon aryl ring of 6 carbon atoms or cycloalkyl ring of 6 carbon atoms, said rings being optionally substituted by alkyl of 1–4 carbon atoms; and
$n$ is an integer from 5 to 500.

2. A process for the production of a linear polyamide as defined by claim 1, which process comprises reacting at 20–200° C.

(a) a 4,6-dioxa-1-azabicyclo[3,3,0]octane of the formula

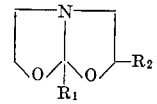

with
(b) a dicarboxylic acid anhydride of the formula

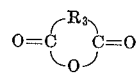

wherein $R_1$, $R_2$ and $R_3$ have the previously indicated meanings.

3. A process as defined by claim 2 wherein the reaction is conducted at 100–180° C.

4. A process as defined by claim 2 wherein the reaction is conducted in the presence of an inert solvent.

5. A process as defined by claim 4 wherein the reaction is conducted at 40–80° C.

6. A process as defined by claim 2 wherein the reaction is conducted in the presence of a stream of dry inert gas.

7. A linear polyester amide as defined by claim 1 wherein $R_1$ represents methyl, ethyl or phenyl, and $R_2$ represents phenyl, phenoxy or allyloxy.

8. A linear polyester amide as defined by claim 7 wherein $R_3$ represents trimethylene.

9. A linear polyester amide as defined by claim 7 wherein $R_3$ represents ethylene.

10. A linear polyester amide as defined by claim 7 wherein $R_3$ represents

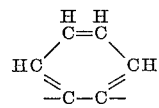

References Cited

UNITED STATES PATENTS 3,216,974  11/1965  Gijzen _____ 260—775

WILLIAM H. SHORT, Primary Examiner

L. L. LEE, Assistant Examiner

U.S. Cl. X.R.

117—161; 260—33.6, 33.8, 75, 78, 78.4

UNITED STATES PATENT OFFICE
CERTIFICATE OF CORRECTION

Patent No. 3,507,830                 Dated April 21, 1970

Inventor(s) ROLAND FEINAUER

It is certified that error appears in the above-identified patent and that said Letters Patent are hereby corrected as shown below:

Column 1, Line 44, change "C=O    $R_2$    O    C" to ---C=O    $R_2$    O    O---

SIGNED AND SEALED
OCT 13 1970

(SEAL)
Attest:

Edward M. Fletcher, Jr.
Attesting Officer

WILLIAM E. SCHUYLER, JR.
Commissioner of Patents